United States Patent [19]
Anumakonda et al.

[11] Patent Number: 5,843,208
[45] Date of Patent: Dec. 1, 1998

[54] PROCESS FOR RECOVERING SULFUR HEXAFLUORIDE

[75] Inventors: Amar Anumakonda, Bensenville; Romulus Gaita, Morton Grove; Stephen Yates, Arlington Heights; Jim Zhou, Palatine, all of Ill.

[73] Assignee: AlliedSignal Inc., Morristown, N.J.

[21] Appl. No.: 899,736

[22] Filed: Jul. 24, 1997

[51] Int. Cl.$^6$ .................................................. B01D 53/22
[52] U.S. Cl. .......................... 95/47; 95/45; 95/51; 95/53; 95/54; 95/55
[58] Field of Search .................................... 95/45, 47, 48, 95/51–55, 131, 135, 142

[56] References Cited

U.S. PATENT DOCUMENTS

| | | | |
|---|---|---|---|
| 3,675,392 | 7/1972 | Reighter | 95/131 X |
| 3,792,570 | 2/1974 | Biondi et al. | 95/48 |
| 4,130,403 | 12/1978 | Cooley et al. | 95/51 X |
| 4,230,463 | 10/1980 | Henis et al. | 55/16 |
| 4,529,411 | 7/1985 | Goddin, Jr. et al. | 95/51 |
| 4,690,695 | 9/1987 | Doshi | 95/55 |
| 4,701,187 | 10/1987 | Choe et al. | 95/53 |
| 4,737,104 | 4/1988 | Croll et al. | 433/141 |
| 4,737,165 | 4/1988 | Kulprathipanja et al. | 55/16 |
| 4,906,796 | 3/1990 | Yates et al. | 570/179 |
| 4,922,044 | 5/1990 | Yates et al. | 570/263 |
| 4,932,986 | 6/1990 | Kulkarni et al. | 55/158 |
| 5,090,971 | 2/1992 | Barbier | 95/45 |
| 5,116,396 | 5/1992 | Prasad et al. | 95/52 X |
| 5,234,471 | 8/1993 | Weinberg | 95/52 X |
| 5,322,549 | 6/1994 | Hayes | 95/45 |
| 5,378,263 | 1/1995 | Prasad | 95/45 X |
| 5,411,721 | 5/1995 | Doshi et al. | 95/51 X |
| 5,482,539 | 1/1996 | Callahan | 95/45 X |
| 5,720,797 | 2/1998 | Yates et al. | 95/135 X |

FOREIGN PATENT DOCUMENTS

| | | |
|---|---|---|
| 0 389 334 | 3/1990 | European Pat. Off. . |
| 47-006205 | 2/1972 | Japan ........ 95/131 |
| 62-192589 | 8/1987 | Japan ........ 95/52 |
| 2-307812 | 12/1990 | Japan ........ 95/54 |
| 6-047233 | 2/1994 | Japan ........ 95/131 |
| SU 1788908 A3 | 3/1991 | Russian Federation . |
| WO 90/13353 | 11/1990 | WIPO . |

OTHER PUBLICATIONS

Srinivasan, R., Journal of Membrane Science, Elucidating the mechanisms of gas transport in PTMSP membranes, 1994, vol. 86, pp. 67–86.

World Patents Index WPI Acc. No. 85–113337/198519 Abstract of JP 60054723.

*Primary Examiner*—Robert Spitzer
*Attorney, Agent, or Firm*—Colleen D. Szuch; Jay P. Friedenson

[57] ABSTRACT

The present invention provides a process for recovering sulfur hexafluoride ("SF$_6$") from a gas stream using membrane separation.

31 Claims, 3 Drawing Sheets

5,843,208

PROCESS FOR RECOVERING SULFUR HEXAFLUORIDE

FIELD OF THE INVENTION

The present invention relates to a process for recovering sulfur hexafluoride ("$SF_6$"). More specifically, the invention provides a process for recovering $SF_6$ from a gas stream using membrane separation.

BACKGROUND OF THE INVENTION $SF_6$, a non-flammable gas used in industry in a variety of applications, is manufactured by any of a number of known processes. In its manufacture, the product $SF_6$ typically must be treated to remove impurities. In so treating the product $SF_6$, some $SF_6$ may be lost as one component of a gaseous stream of the non-condensible impurities removed. The gas stream of impurities and some $SF_6$ is vented to the atmosphere. Not only does this result in loss of $SF_6$ produced, but it is environmentally undesirable because $SF_6$ is suspected of being a "green-house", global warming gas.

A number of processes for separating $SF_6$ from other gases are known. J. J. Perona and J. S. Watson in "Sulfur Hexafluoride Purification From Mixtures With Air: A Process Feasibility Study" disclose the adsorption of $SF_6$ from an air-$SF_6$ mixture using activated carbon and temperatures below $-50°$ F. This process is disadvantageous because it is an energy-intensive process.

In C. Brassard, *Proceedings of the Symposium of Northeast Accelerator Personnel (S.N.E.A.P.)*, 60 (1976), a process for recovering $SF_6$ using activated charcoal adsorption is disclosed. In this process, short bursts of gas are admitted to a column and the impurities, traveling at a faster rate than the $SF_6$, exit before the $SF_6$. This method is disadvantageous because it is impractical for use in industry.

Further, U.S. Pat. No. 3,675,392 discloses the use of molecular sieves to separate water and carbon dioxide from $SF_6$. However, the process disclosed in this patent is a batch process and suitable only for gas streams in which $SF_6$ is the major component. Finally, Japanese Patent Application No. 60-054723 discloses the removal of water and carbon dioxide from $SF_6$ using calcium hydride. This process is disadvantageous because calcium hydride is a dangerous material and has a relatively low capacity for removal of water and carbon dioxide.

None of the foregoing methods provides an industrial useful method for recovering $SF_6$ from a gas stream in which $SF_6$ is a minor component. Therefore, a need exists for a cost-effective, efficient, industrial useful method for recovering $SF_6$.

DESCRIPTION OF THE INVENTION AND ITS PREFERRED EMBODIMENTS

Figure 1:
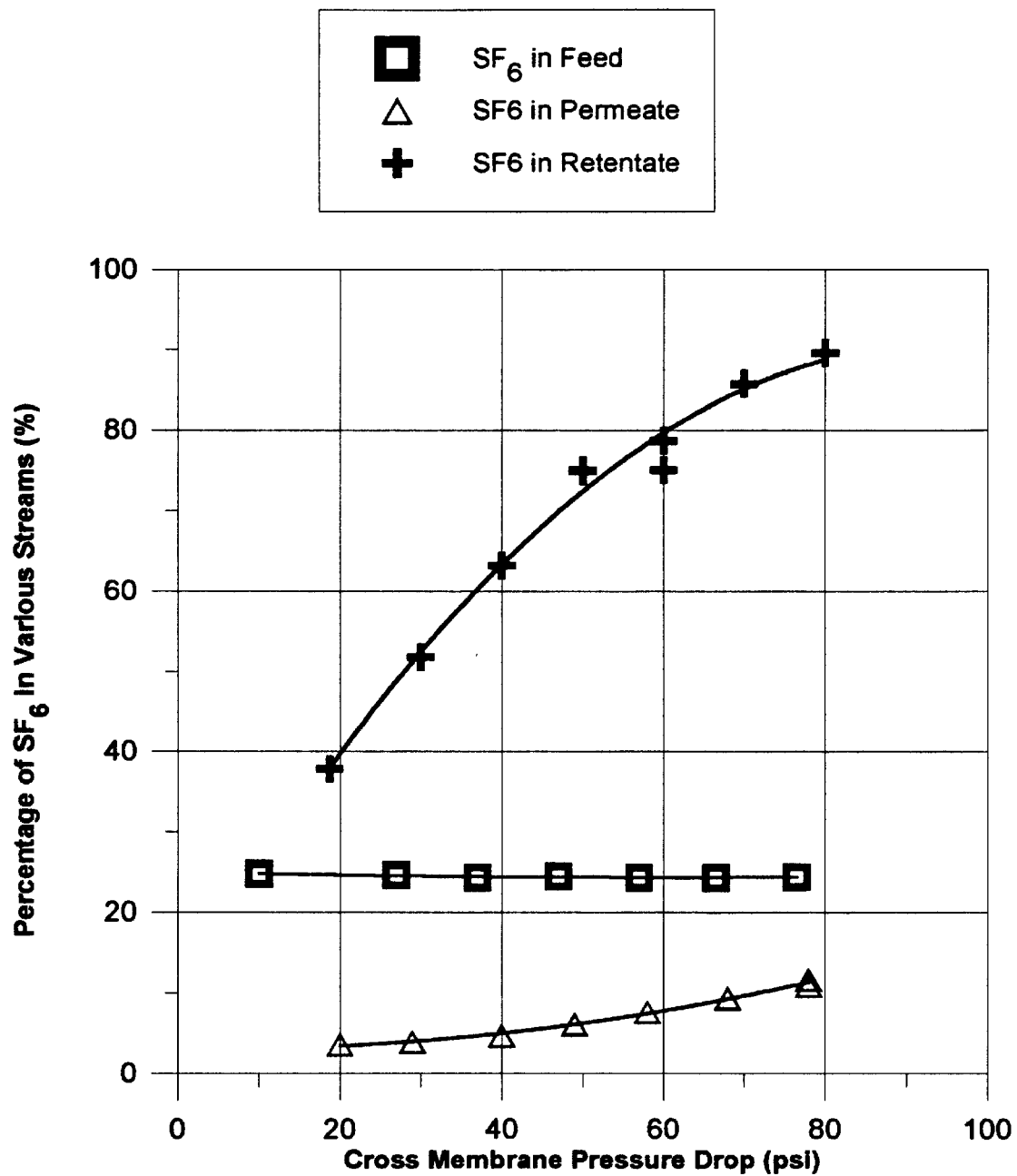
FIG. 1 depicts the volume percentage of $SF_6$ in three gas streams as a function of cross-membrane pressure drop.

The invention provides a simple, economical method for recovering $SF_6$ from a gas stream. The process of the invention comprises contacting a feed gas stream comprising a minor amount of $SF_6$ with a membrane under conditions suitable to form a $SF_6$-rich retentate gas stream and a $SF_6$-poor permeate gas stream. Optionally, the process additionally comprises recovering $SF_6$ from the permeate gas stream.

By "$SF_6$-poor permeate gas stream" is meant that portion of the feed gas stream that passes through the membrane, which permeate gas stream has a concentration of $SF_6$ that is less than that of the feed gas stream. Conversely, "$SF_6$-rich retentate gas stream" means that portion of the feed gas stream retained by the membrane, which retentate gas stream has a $SF_6$ concentration that is greater than that of the feed gas stream.

The feed gas streams useful in the invention contain a minor amount of $SF_6$ along with at least one other component, which component is at least one non-condensible gas. By "minor amount" is meant an amount of less than 50 volume percent, preferably less than about 20 volume percent, more preferably about 1 volume percent of $SF_6$ based on the total volume of the feed gas stream.

The other component of the feed gas stream may be one or more non-condensible gases. The other component typically will be one or more of air, helium, argon, carbon monoxide, carbon dioxide, nitrogen, oxygen, neon, hydrogen, or the like.

The membranes useful in the process of the invention are any membranes capable of permitting permeation of the at least one other component of the feed gas stream through the membrane faster than $SF_6$. Exemplary membranes include, without limitation, non-porous membranes of pure or modified cellulose acetates, polycarbonates, polyimides, and the like. Preferably, the membrane is made of cellulose acetate. Suitable membranes are commercially available.

The membrane may be of any configuration that is suitable for achieving separation of the SF6 from the non-condensible gases. For example, the membrane may be a hollow fiber membrane or a sheet membrane. Any hollow fiber membrane having an outer diameter of about 3 to about 10, preferably from about 4 to about 6, microns, an inner diameter of from about 1 to about 5, preferably from about 2 to about 3, microns and a wall thickness of from about 1 to about 4, preferably from about 1 to about 2, microns may be used. The sheet membranes may have a thickness of from about 1 to about 5, preferably from about 1 to about 3, microns.

It is known to those ordinarily skilled in the art that membrane permeabilities are related to the fundamental properties of the membrane and the permeants by the equation:

$$P = S \times D$$

wherein P is the permeability of a specific gas through the membrane, S is the solubility of the gas in the membrane, and D is the diffusivity of the gas through the membrane. Selectivity is the ratio of the permeability of the desired component to the permeability of the other components in the feed gas. Thus, obtaining a high selectivity for any one component will involve obtaining a higher permeability for that component than for the other components. This in turn implies that either there is a significant difference in the solubilities of the desired versus the undesired components, or there is a significant difference in the diffusivities of the gases through the membrane. It is to be noted that because the presence of a second component can affect either the solubility or the diffusivity of the first component, measuring permeabilities, solubilities or diffusivities of pure components will lead to confusing and misleading conclusions.

Membranes separate on the basis of either solubility or diffusivity. Membranes that separate on the basis of solubility generally are rubbery membranes that have a greater ability to solubilize gases than non-rubbery membranes. Membranes that separate on the basis of diffusivity are non-rubbery, more crystalline, membranes that act as if they contained a multitude of molecule-sized pores. Membranes useful in the current invention are of the latter category and are characterized as having diffusivities for air that are greater than those for $SF_6$ by a factor of at least about 10. This corresponds to a selectivity for nitrogen over $SF_6$ of at least about 2.6.

Further, useful membranes for purposes of the invention have a good flux for air components, like nitrogen, under the process conditions. A low flux will require that more membrane surface area be used to maintain the same flow rate or a higher pressure drop, either of which increases the process cost. The requirement for high flux translates into a requirement for high permeability for the permeant. Thus, suitable membranes for the invention have a permeability coefficient for nitrogen of greater than about $0.21 \times 10^3$ $cm^3/cm^2$ s Pa.

Contacting of the feed gas stream and membrane may take place in any manner known in the art. For example, if a hollow tube membrane is used, the feed gas stream may be passed through the tube. In cases in which a sheet membrane is used, the feed gas stream is passed over the upstream surface of the membrane.

The contacting is performed under conditions such that an $SF_6$-rich retentate and $SF_6$-poor permeate are formed. Preferably, contacting is performed with the feed gas under pressure. Alternatively, contacting may be performed with a pressure vacuum on the permeate side of the membrane. The pressure and temperature will be selected to obtain the maximum efficiency desired for $SF_6$ recovery given the feed gas flow rate. Generally, the pressure will be from about 10 to about 90 psia, preferably from about 55 to about 65 psia. Contacting generally will take place at a temperature of from about –30 to about 80, preferably from about 20 to about 30° C.

Optionally, the process of the invention includes the step of recovering $SF_6$ in the permeate gas stream by contacting the permeate gas stream with a membrane under a different set of conditions. For example, staging membrane units to operate at successively higher pressures may be used. Alternatively and preferably, SF6 may be recovered from the permeate gas stream by contacting the permeate gas stream with an adsorbent.

Adsorbents useful for such contacting are any adsorbents capable of selectively adsorbing $SF_6$. By "selectively adsorbing" is meant that the adsorbent has an affinity for $SF_6$ that is greater than its affinity for the other component or components in the permeate. Preferably, the adsorbent has an affinity for $SF_6$ such that $SF_6$ is substantially entirely removed from the permeate while little or none of the other component or components is removed. Suitable adsorbents useful in the invention are commercially available. Examples of useful adsorbents include, without limitation, zeolites, activated carbons, and silicalite. Preferably, zeolites or activated carbons are used. More preferably, activated carbons are used as the adsorbent.

Zeolites that may be used in the process of the invention are natural or synthetic zeolites with mean pore sizes of greater than about 5, preferably from about 5 to about 20, Å. Preferably, the zeolite used is X or Y Faujasite zeolite. More preferably, sodium X (13X) zeolite is used.

Activated carbons useful in the invention are any of the granular, activated carbons with a mesh of from about 4 to about 300, preferably from about 20 to about 50. In terms of surface area, the activated carbon has a surface area of at least about 200 $m^2/g$, preferably from about 1000 to about 1500 $m^2/g$. Preferably, the activated carbon is PCB or ASC carbon.

The amount of adsorbent used is an amount effective to allow the adsorption cycle to run for the period desired before regeneration of the adsorbent is necessary. The precise amount of adsorbent used will be readily determinable by one ordinarily skilled in the art by considering the chosen adsorbent's capacity, the desired time period between adsorbent regenerations, and the flow rate of the permeate gas stream.

Contacting of the permeate gas stream and adsorbents may take place in any manner known in the art. Preferably, contacting takes place by passing the permeate gas stream through a fixed, packed bed of adsorbent. Passage of the permeate gas stream takes place at a gas hourly space velocity of less than about 240, preferably less than about 100, $h^{-1}$.

The contacting is performed under any conditions such that the selective adsorption of $SF_6$ from the gas stream is facilitated. Accordingly, the temperature and pressure for contacting will be such that the temperature is greater, preferably about 10° C. greater, than the boiling point of $SF_6$ for the contacting pressure. Preferably, contacting is performed at a temperature of from about 10 to about 40° C., preferably from about 25 to about 40° C. Most preferably, contacting is performed at room temperature. The pressure at which contacting is carried out is at least about 5,170 torr (100 psia), preferably at least about 10,340 torr (200 psia).

$SF_6$ adsorbed in the contacting step may be regenerated from the adsorbent by any convenient manner. Preferably, the regeneration is performed by lowering the pressure to about 760 torr (14.7 psia), more preferably to about 100 torr (1.93 psia), most preferably to about 40 torr (0.77 psia) over the adsorbent bed releasing the $SF_6$ so that it may be collected. The regeneration so performed may take place at temperatures of at least about 10° C., preferably at least about 25° C. The time necessary to regenerate the $SF_6$ will depend on the amount of $SF_6$ adsorbed on the adsorbent as well as the amount of adsorbent used. Generally, regeneration will take place in from about 5 to about 40 hours.

The process of the invention may be used to recover $SF_6$ from any gas stream, but may find its greatest utility in recovering $SF_6$ from gas streams in which the $SF_6$ is present in a minor amount. For example, in the manufacture of $SF_6$, the $SF_6$ produced is typically distilled and purified $SF_6$ is removed as the column bottoms stream. The column overhead stream will contain a minor amount of $SF_6$ as well as other components. $SF_6$ may be recovered from the overhead stream by using the process of the invention.

The invention will be clarified further by the following, non-limiting examples.

EXAMPLES

In the following examples, a feed mixture of $SF_6$-and air was separated using an AVIR™ air separation membrane module, available from A/G Technology Corporation. Dry air and $SF_6$ were first introduced as separate streams into a gas mixer at room temperature. Mass flow rates for both gases were individually controlled. The gas mixture exiting the mixer was introduced as the feed stream for the membrane module. The retentate stream, at the membrane outlet, was subjected to a back pressure, which pressure was communicated to the feed stream. The permeate stream was maintained at atmospheric pressure.

Example 1

A feed gas was prepared from air, at a flow rate of 380±3 mL/min, and $SF_6$, at a flow rate of 120±2 mL/min. The concentration of $SF_6$ in the feed gas was 24.6±2%. The back pressure on the retentate side of the membrane was 30 psia. Separation yielded a retentate with a 51.8±2% $SF_6$ concentration at a flow rate of 193±2 mL/min and a permeate with a 3.9±0.1% $SF_6$ concentration at a flow rate of 315±3 mL/min.

Examples 2–8

The procedure of Example 1 was performed except that the cross-membrane pressure drop was varied. Table 1 lists the $SF_6$ concentrations and flow rates of the feed, retentate and permeate streams. The variability in the concentration data was within ±0.25% and the flow data within ±5 sccm.

TABLE 1

| Cross-Membrane Pressure Drop | Feed $SF_6$ concentration | Permeate $SF_6$ Concentration | Retentate $SF_6$ Concentration |
| --- | --- | --- | --- |
| 25 psia | 15.7% (1146 sccm) | 1.5% (546 sccm) | 26.8% (660 sccm) |
| 35 psia | 15.6% (1096 sccm) | 1.6% (407 sccm) | 33% (689 sccm) |
| 45 psia | 14.6% (1078 sccm) | 2.1% (277 sccm) | 43.6% (801 sccm) |
| 55 psia | 15.1% (1055 sccm) | 2.5% (185 sccm) | 56.3% (870 sccm) |
| 65 psia | 15.5% (1059 sccm) | 3.3% (150 sccm) | 67.4% (909 sccm) |
| 75 psia | 15.9% (1066 sccm) | 4.1% (100 sccm) | 79.1% (966 sccm) |
| 85 psia | 14.1% (1076 sccm) | 5.2% (76 sccm) | 87.4% (1000 sccm) |

Example 9

Figure 2:
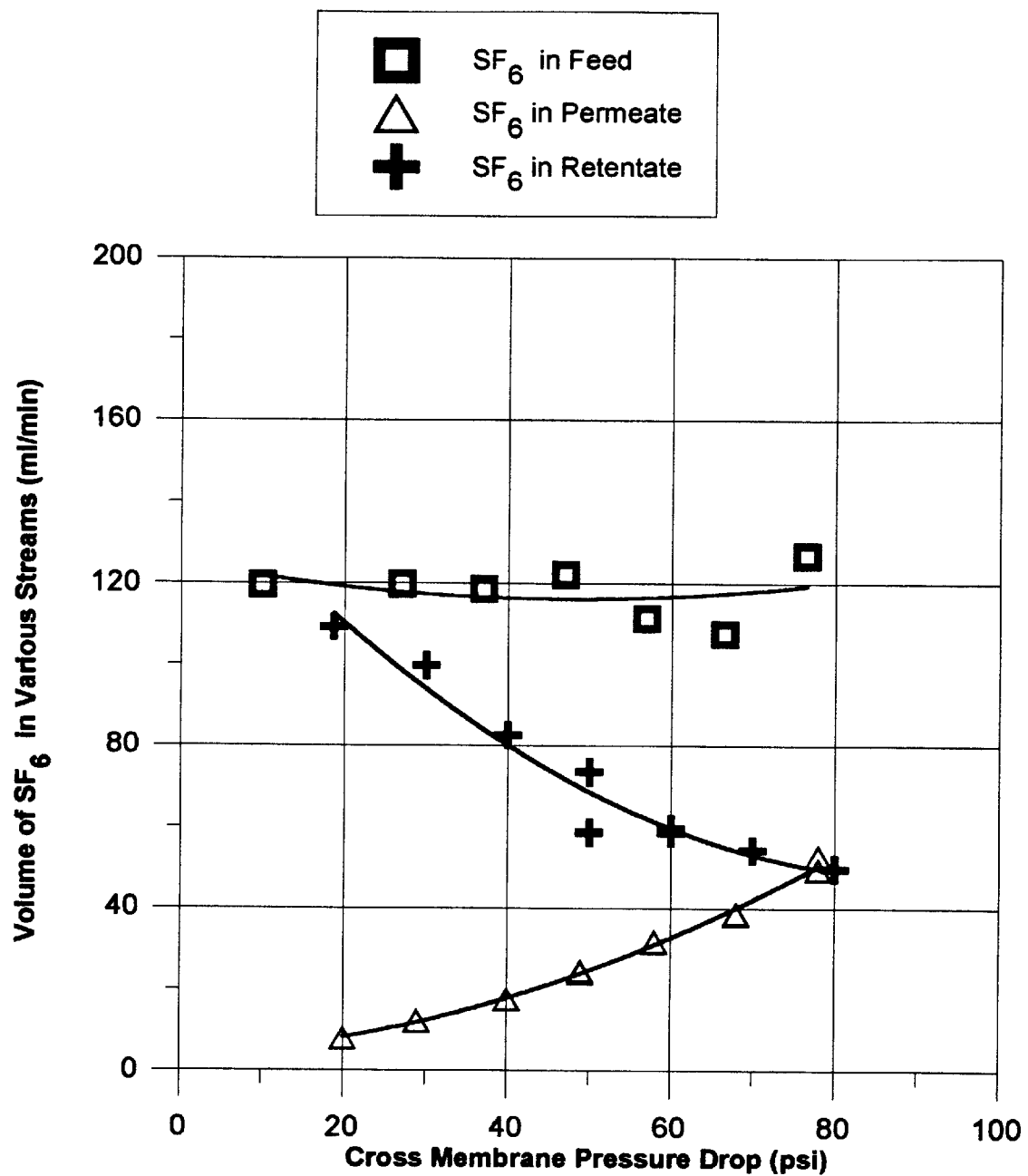
FIG. 2 depicts the decrease in $SF_6$ volume in the retentate stream as the cross-membrane pressure decreases.
Figure 3:
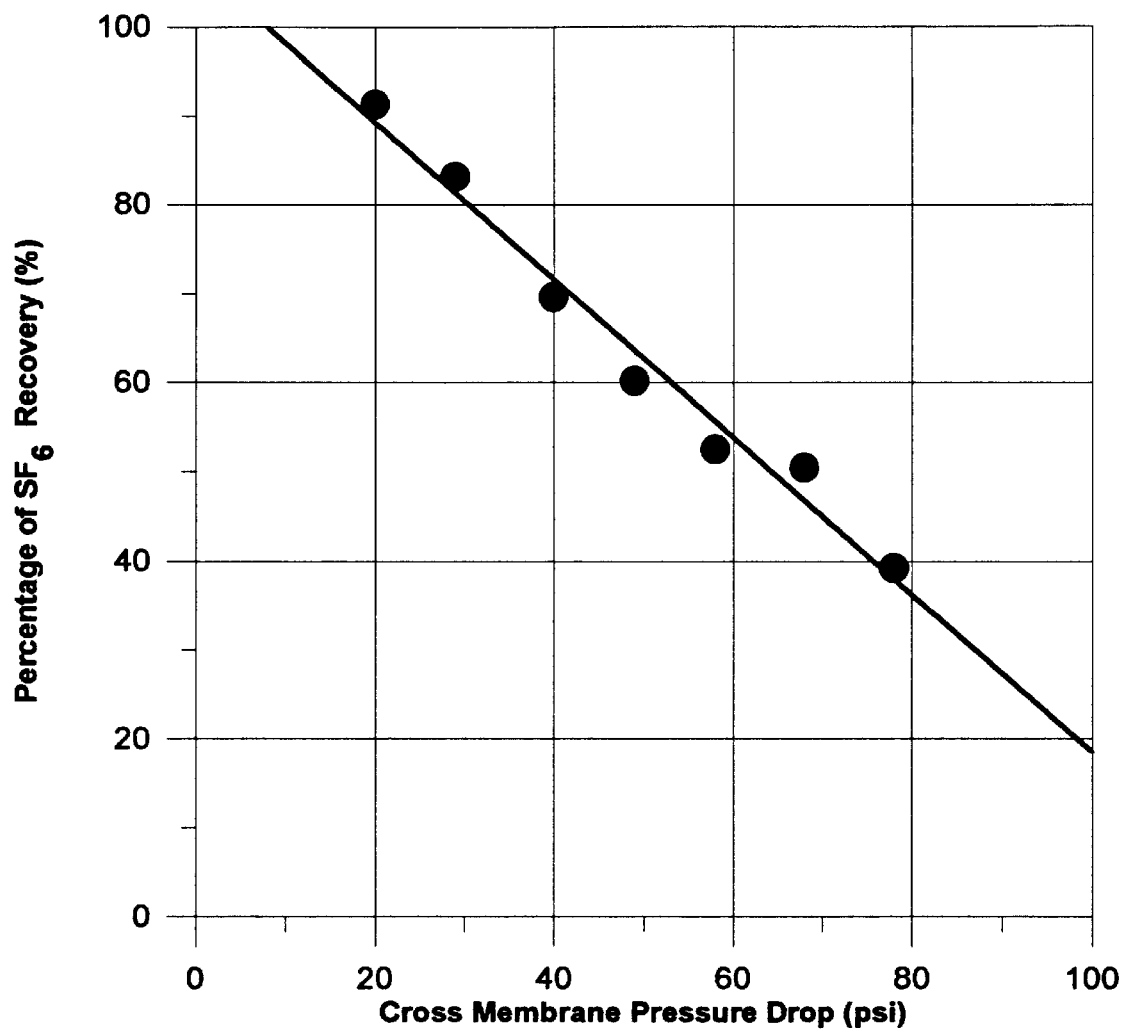
FIG. 3 depicts the dependence of $SF_6$ recovery on cross-membrane pressure decrease.

The procedure of Example 1 was used. The feed mixture $SF_6$ concentration was 24±2%. Pressure drops across the membrane were varied by increasing the back pressure on the retentate stream leaving the membrane. Experiments were performed by increasing the cross-membrane pressure drop by 10 psi and measuring the $SF_6$ concentrations in the feed, retentate and permeate stream. FIG. 1 shows the $SF_6$ in the three streams as a function of the cross-membrane pressure drop. As the cross membrane pressure drop increases from 20 to 80 psia, the concentration of $SF_6$ in the retentate stream increases from 40 to 90% and in the permeate stream, from 5 to 10%. With the increasing concentration of $SF_6$ in the retentate stream, the total volume of $SF_6$ in the retentate stream decreases as the cross-membrane pressure drop increases as shown in FIG. 2. The dependence of $SF_6$ recovery, defined as the amount of $SF_6$ recovered in the retentate stream to the total amount of $SF_6$ in the feed stream, on the cross-membrane pressure drops as shown in FIG. 3.

What is claimed is:

1. A process for recovering sulfur hexafluoride comprising the step of contacting a feed gas stream comprising a minor amount of sulfur hexafluoride and at least one non-condensible gas with a membrane under conditions suitable to form a sulfur hexafluoride-rich retentate gas stream and a sulfur hexafluoride-poor permeate gas stream.

2. The process of claim 1 wherein the minor amount of sulfur hexafluoride is an amount less than about 50 volume percent based on the total volume of the feed gas stream.

3. The process of claim 1 wherein the minor amount of sulfur hexafluoride is an amount of about 1 volume percent based on the total volume of the feed gas stream.

4. The process of claim 1 wherein the at least one non-condensible gas is air, argon, carbon monoxide, carbon dioxide, helium, hydrogen, neon, nitrogen, or oxygen.

5. The process of claim 1 wherein the at least one non-condensible gas is nitrogen.

6. The process of claim 1 wherein the at least one non-condensible gas is air.

7. The process of claim 1 wherein the membrane has a selectivity for the at least one non-condensible gas over sulfur hexafluoride of about 2.6.

8. The process of claim 1 wherein the membrane has a permeability coefficient for the at least one non-condensible gas of less than about $0.21 \times 10^3$ $cm^3/cm^2$ s Pa.

9. The process of claim 1 wherein the membrane is a cellulose acetate membrane, a polycarbonate membrane, or a polyimide membrane.

10. The process of claim 1 wherein the membrane is a cellulose acetate membrane.

11. The process of claim 1 wherein the contacting is performed under pressure.

12. The process of claim 11 wherein the contacting is performed at a pressure of about 10 to about 90 psia.

13. The process of claim 11 wherein the contacting is performed at a pressure of about 55 to about 65 psia.

14. A process for recovering sulfur hexafluoride comprising the step of contacting a feed gas stream comprising less than about 50 volume percent sulfur hexafluoride based on the total volume of the feed gas and at least one non-condensible gas selected from the group consisting of air, argon, carbon monoxide, carbon dioxide, helium, hydrogen, neon, nitrogen, and oxygen at a pressure of about 10 to about 90 psia with a membrane to form a sulfur hexafluoride-rich retentate gas stream and a sulfur hexafluoride-poor permeate gas stream.

15. The process of claim 14 wherein the feed gas stream contains less than about 20 volume percent sulfur hexafluoride.

16. The process of claim 14 wherein the feed gas stream contains about 1 volume percent sulfur hexafluoride.

17. The process of claim 14 wherein the at least one non-condensible gas is nitrogen.

18. The process of claim 14 wherein the at least one non-condensible gas is air.

19. The process of claim 14 wherein the pressure is about 55 to about 65 psia.

20. The process of claim 14 wherein the membrane has a selectivity for the at least one non-condensible gas over sulfur hexafluoride of about 2.6.

21. The process of claim 14 wherein the membrane has a permeability coefficient for the at least one non-condensible gas of less than about $0.21 \times 10^3$ $cm^3/cm^2$ s Pa.

22. The process of claim 14 wherein the membrane is a cellulose acetate membrane, a polycarbonate membrane, or a polyimide membrane.

23. The process of claim 14 wherein the membrane is a cellulose acetate membrane.

24. A process for recovering sulfur hexafluoride comprising the step of contacting a feed gas stream comprising less than about 20 volume percent sulfur hexafluoride based on the total volume of the feed gas and at least one non-condensible gas selected from the group consisting of air, argon, carbon monoxide, carbon dioxide, helium, hydrogen, neon, nitrogen, and oxygen at a pressure of about 10 to about 90 psia with a membrane having a selectivity for the at least one non-condensible gas over sulfur hexafluoride of about 2.6 to form a sulfur hexafluoride-rich retentate gas stream and a sulfur hexafluoride-poor permeate gas stream.

25. The process of claim 24 wherein the at least one non-condensible gas is nitrogen.

26. The process of claim 24 wherein the at least one non-condensible gas is air.

27. The process of claim 24 wherein the pressure is about 55 to about 65 psia.

28. The process of claim 24 wherein the membrane has a permeability coefficient for the at least one non-condensible gas of less than about $0.21 \times 10^3$ cm$^3$/cm$^2$ s Pa.

29. The process of claim 24 wherein the membrane is a cellulose acetate membrane, a polycarbonate membrane, or a polyimide membrane.

30. The process of claim 24 wherein the membrane is a cellulose acetate membrane.

31. The process of claim 24 wherein the feed gas stream contains about 1 volume percent sulfur hexafluoride.

* * * * *